(12) United States Patent
Thames et al.

(10) Patent No.: US 6,193,447 B1
(45) Date of Patent: Feb. 27, 2001

(54) POSITIVE FEED TOOL HAVING A RETRACT VALVE

(75) Inventors: Bruce A. Thames, Cypress, TX (US); Sam C. Jensen, Glendora, CA (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 09/335,734

(22) Filed: Jun. 18, 1999

(51) Int. Cl.[7] .................................................. B23B 35/00
(52) U.S. Cl. .......................... 408/1 R; 408/124; 408/130; 408/137
(58) Field of Search ............................. 408/1 R, 17, 124, 408/137, 138, 141, 130

(56) References Cited

U.S. PATENT DOCUMENTS

| | | | |
|---|---|---|---|
| 3,583,822 | * | 6/1971 | Alexander ............................. 408/137 |
| 3,767,313 | * | 10/1973 | Bohoroquez et al. ................ 408/132 |
| 4,538,942 | * | 9/1985 | Vindez .................................... 408/14 |
| 4,591,299 | * | 5/1986 | Eckman ................................ 408/1 R |
| 4,592,681 | * | 6/1986 | Pennison et al. ...................... 408/14 |
| 4,627,773 | * | 12/1986 | Ehnert .................................. 408/137 |
| 4,650,377 | | 3/1987 | Biek . |
| 4,681,490 | * | 7/1987 | Pennsion et al. ...................... 408/14 |
| 4,799,833 | * | 1/1989 | Pennion et al. ..................... 408/139 |
| 5,062,745 | * | 11/1991 | Eckman ................................ 408/17 |
| 5,149,232 | * | 9/1992 | Eckman .............................. 408/137 |
| 5,295,770 | * | 3/1994 | Pennison et al. ........................ 408/6 |

FOREIGN PATENT DOCUMENTS

| | | |
|---|---|---|
| 0 169 109 | 1/1986 | (EP) . |
| 1 554 169 | 10/1979 | (GB) . |

* cited by examiner

*Primary Examiner*—A. L. Wellington
*Assistant Examiner*—Monica S. Carter
(74) *Attorney, Agent, or Firm*—Coats & Bennett, PLLC (57) ABSTRACT

A positive feed tool having a retract valve. The retract valve is manually actuatable so as to cause an advancing spindle of the tool to retract away from a workpiece. The retract valve is configured to automatically return its unactuated position after the retract valve is manually actuated so as to cause the spindle to once again advance toward the workpiece.

22 Claims, 9 Drawing Sheets

FIG. 8

POSITIVE FEED TOOL HAVING A RETRACT VALVE

BACKGROUND OF THE INVENTION

1. Field of the Invention

The present invention relates to positive feed tools, such as right angle positive feed drills, and more particularly, to a method and apparatus for retracting a spindle of the drill by actuating a valve.

2. Description of the Related Art

Positive feed tools, such as positive feed drills are conventionally known for drilling holes in workpieces formed of substances, such as steel, aluminum, titanium, and composites. Positive feed drills include a drill feed mechanism that feeds a drill bit into the workpiece.

During drilling with positive feed drills, cutting chips are generated when the drill bit penetrates through the workpiece. These chips may affect the final dimension of the drilled hole if they are not removed during the drilling process. Additionally, the cutting chips occasionally cease the drill bit, which may damage the spindle, gears, bearings, or other components of the drill.

One technique for removing chips during drilling is called "peck drilling." Peck drilling refers to a drilling technique whereby the rotating drill bit is advanced and then occasionally or periodically retracted to remove the cutting chips from the drilled hole and the flutes of the drill bit.

Some positive feed drills include a mechanism by which an operator of the positive feed drill can cause the spindle of the drill to retract.

For example, one conventional positive feed drill includes a retract lever. The spindle of the drill may be manually retracted by the operator physically pulling the retract lever up, in a direction away from the tool. With this conventional drill the spindle will continue to retract until the retract lever is physically pushed back down again, in a direction toward the tool. When the retract lever of this tool is pulled up, the differential feed gear of the tool is mechanically disengaged from the differential drive gear of the tool. Additionally, the differential feed gear is prevented from rotating when the retract lever is pulled up. Because the differential feed gear is prevented from rotating, the spindle will retract. However, with this technique of retracting the spindle, the retract lever must be manually forced down after the desired amount of retracting has occurred. This is problematic because the retract lever is necessarily located near the head of the drill, where the spindle and drill bit are rotating. Thus, many operators of such drills are wary of repeatedly moving the retract lever to peck drill.

Another conventional right angle positive drill also includes a manual retract lever near the spindle of the drill, which must be lifted upward to retract the spindle. When the spindle fully retracts, the motor of the tool is shut down. With this conventional drill, the spindle cannot be advanced after the retract lever has been pulled, unless the tool is completely shut off either manually or by permitting the spindle to fully retract, which will automatically shut off the motor of the tool. Only after the spindle has fully retracted and the motor has been shut down can an operator cause the spindle to once again advance toward the workpiece. Thus, it is very difficult for an operator of this conventional drill to remove cutting chips by peck drilling.

Thus, it is apparent that conventional positive feed drills are not well suited for peck drilling, and thus occasionally suffer from the problems associated with cutting chips, namely ceased spindles and galled holes. The above-described constraints and problems associated with conventional positive feed tools has created a need for a positive feed tool that may be used to peck drill more easily than conventional positive feed drills.

SUMMARY OF THE INVENTION

Generally speaking, the present invention provides a positive feed tool that may be used to peck drill a workpiece.

According to one aspect of the present invention, a positive feed tool includes a positive feed tool having a threaded spindle, and a spindle drive gear coupled to the spindle such that the spindle and the spindle drive gear rotate together. A spindle feed gear is threaded on the spindle. A differential drive gear is engaged with the spindle drive gear. A differential feed gear is engaged with the spindle feed gear. At least one of the differential feed gear and the differential drive gear is moveable from a first position to a second position. The differential feed gear is coupled to the differential drive gear when the one of the differential feed gear and the differential drive gear is located at the first position such that the differential feed gear and the differential drive gear rotate together. The differential feed gear is not coupled to the differential drive gear when the at least one of the differential feed gear and the differential drive gear is located at the second position. The tool also includes a retract valve having a member manually movable from a first location to a second location. The member defines a seal when located at the first location. The retract valve is configured to automatically return the member to the first location after the member is manually moved from the first location to the second location and after the valve has been released. The retract valve causes the at least one of the differential feed gear and the differential drive gear to move to the second position from the first position when the member is at the second location. The retract valve causes the at least one of the differential feed gear and the differential drive gear to move to the first position from the second position when the member is at the first location.

In accordance with a further aspect of the present invention, the retract valve is located toward the rear of the positive feed tool.

According to another aspect of the present invention, a positive feed tool includes a spindle, a motor, and a drive train rotatably connecting the motor and the spindle. The tool includes a manually openable valve, a device for automatically closing the valve after the valve has been manually opened and released, and a device for causing the spindle to retract when the valve is manually opened, and a device for causing said spindle to advance when said valve is automatically closed.

In accordance with another aspect of the present invention, a method in a positive feed tool includes: retracting an advancing spindle of the tool by manually actuating the valve of the tool, and then advancing the retracting spindle after the valve is released.

A further aspect of the present invention pertains to a positive feed tool having a rotatable spindle adapted to undergo advancing movement and retracting movement. The tool further includes a motor, and a drive train rotatably connecting the motor and the spindle. The drive train causes the spindle to undergo the advancing movement and causes the spindle to under go the retracting movement. A manually actuatable fluid valve is operable in a first mode that causes the spindle to switch from the advancing movement to the retracting movement and is operable in a second mode that causes the spindle to switch from the retracting movement to the advancing movement.

Other objects, advantages and features associated with the present invention will become readily apparent to those skilled in the art from the following detailed description. As will be realized, the invention is capable of other and different embodiments, and its several details are capable of modification in various obvious aspects, all without departing from the invention. Accordingly, the drawings and the description are to be regarded as illustrative in nature, and not limitative.

DETAILED DESCRIPTION OF THE PREFERRED EMBODIMENT

The present invention relates to a method and apparatus for causing a positive feed tool to automatically retract a spindle of the tool when an operator of the tool actuates a valve.

Figure 1:
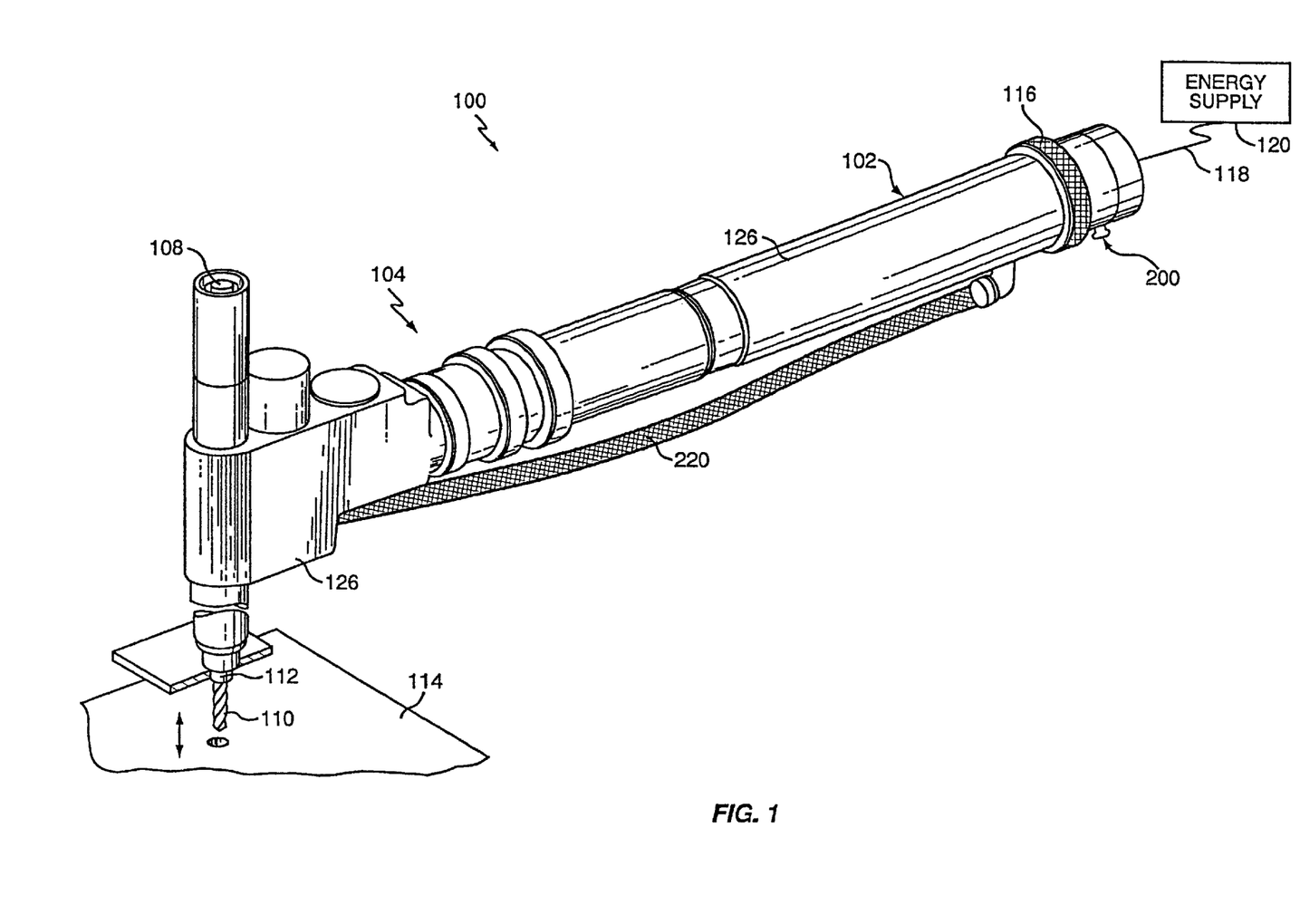
FIG. 1 is a perspective view of a right-angle positive feed drill according to one embodiment of the present invention.

According to one embodiment of the present invention, a positive feed tool, such as a right-angle positive feed drill 100, is illustrated in FIG. 1. The right-angle positive feed drill 100 includes features similar to those described in U.S. Pat. Nos. 4,799,833 and 4,591,299, the entire disclosures of which are hereby incorporated by reference. However, it will be realized that the aspects of the present invention are also applicable to other positive feed tools, such as in-line positive feed drills.

The positive feed drill 100 is essentially a tool for boring holes or reaming holes in a workpiece 114. As described below, a feature of the positive feed drill 100 is that it is configured to advance a spindle 108 away from the body of the tool, i.e., toward the workpiece 114, while the spindle 108 is rotating.

The positive feed drill 100 includes a motor 102, such as a liquid driven motor, an air driven motor, or an electric motor. Hence, the motor 102 is an engine or mechanism that converts a natural source of energy into mechanical power. Thus, the motor 102 is connected to an energy supply 120 such as a device having pressurized gas, pressurized fluid, or electricity. In the preferred embodiment, the motor 102 is an air driven or pneumatic motor, similar to that used in Quackenbush Positive Feed Drill Model Nos. 230QGDA-RAC-SU-MS and 15QDA-RAB-SU-RS, commercially available from Cooper Power Tools, Houston Operation, Houston, Tex., USA.

The energy supply 120 is connected to the motor 102 via a line 118. The line 118 may be a cable, a hose, or other energy transfer conduit. The motor 102 of the tool 100 may be caused to operate by an operator manually actuating a throttle 116, such as a motor actuation lever or ring.

A drive train 104 rotatably connects the motor 102 and the spindle 108. The drive train 104 is essentially a transmission system from an output shaft of the motor 102 to the spindle 108. Hence, when the output shaft of the motor 102 is caused to rotate, the spindle 108 will also rotate. Because the tool 100 is a positive feed device, it also includes a feed mechanism by which the spindle 108 may be fed to the workpiece and/or retracted from the workpiece. In this particular embodiment, the feed mechanism is part of the drive train 104.

The positive feed drill 100 further includes a cutter 110 fixed to the spindle 108. The cutter 110 can be fixed to the spindle by a fixing device 112. The fixing device 112 can be a chuck, such as a four-jaw independent, a four-jaw self-center ring, a three-jaw self-center, or other types of chucks that function to fix the cutter 110 to the spindle 108. Alternatively, the cutter 110 may be fixed to the spindle 108 with a collet, a threaded connection, morse tapers, set screws, or other similar fixing devices. The chuck 112 holds the cutter 110, which can be a cutting tool, drill bit, reamer, or other device for manipulating the workpiece 114. Because the cutter 110 is connected to the spindle 108 via the chuck 112, the cutter 110 will rotate when the spindle 108 rotates. Hence, the cutter 110 will move toward and away from a workpiece 114 with the spindle 108, as illustrated by the arrow in FIG. 2. If the cutter 110 is a drill bit, the right angle positive feed drill 100 can be actuated by the throttle 116 such that it enters into a drilling cycle where the spindle 108 is rotated and fed toward the workpiece 114. This will cause the cutter 110 to drill a hole through the workpiece 114.

Figure 2:
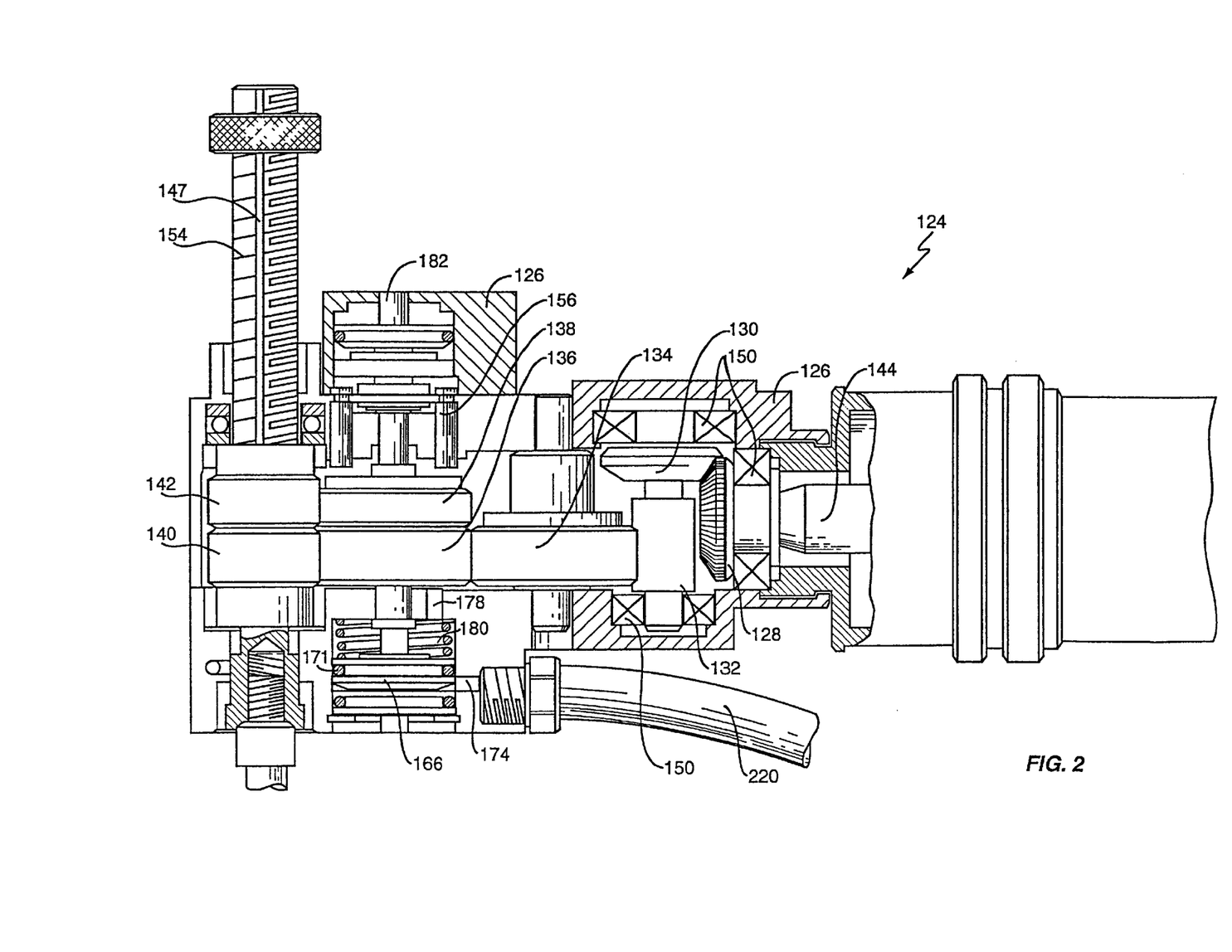
FIG. 2 is a partial sectional view of the head and middle portion of the right-angle positive feed drill illustrated in FIG. 1.
Figure 3:
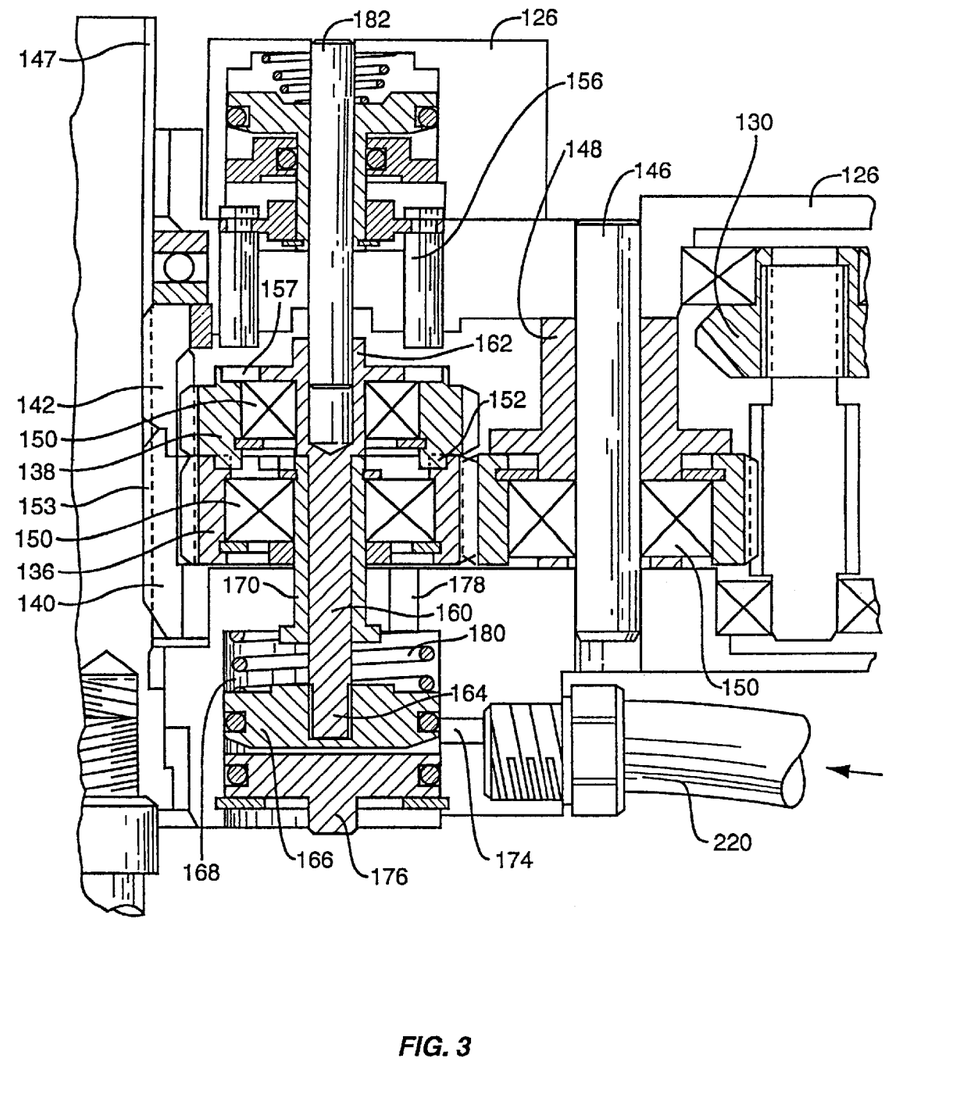
FIG. 3 is a partial sectional view of the head of the right-angle positive feed drill illustrated in FIG. 1.

As illustrated in FIGS. 2 and 3, the right-angle positive feed drill 100 preferably includes a planetary gear section 124 that is part of the drive train 104. The planetary gear section 124 essentially reduces the rotational output of the motor 102. The right-angle positive feed drill 100 further includes a housing 126 that houses the internal components of the right-angle positive feed drill 100. The housing 126 may be defined by one body. Likewise, the housing 126 may be defined by many different bodies, which is the case in the preferred embodiment of the tool 100. The positive feed drill 100 includes a plurality of gears 128, 130, 132, 134, 136, 138, 140, and 142, which operate to rotate, feed, and retract the spindle 108. In the forward operation, or in the drilling mode, the motor 102 turns in a clockwise direction (as viewed from the rear of the tool 100 illustrated in FIG. 1), and indirectly drives a shaft 144. The shaft 144 is splined at its most distal end, and drives the bevel gear 128, which in turn drives the driven bevel gear 130, which is pinned or keyed to a shaft and pinion 132. The shaft and pinion 132 drives an idler gear 134, which is mounted on a shaft 146 and held in place by a bearing spacer 148. The idler gear 134 drives the differential or main drive gear 136. A plurality of bearing assemblies 150 support or hold the rotating shafts and gears in their respective positions, as illustrated in FIGS. 2 and 3.

In forward drill mode, as illustrated in FIGS. 2 and 3, the differential drive gear 136 is coupled with a differential feed gear 138 so that they turn in unison. More specifically, the feed gear 138 includes a plurality of protrusions 152, such as lugs, pins, ears, or other similar items on a bottom surface of the differential feed gear 138 that engage with recesses 158 or similar protrusions on the top surface of the differential drive gear 136 so that when the differential drive gear 136 is rotated, the differential feed gear 138 will also rotate (See FIG. 4). However, the differential feed gear 138 can also have a plurality of recesses on its bottom surface for receiving protrusions on the top surface of the differential drive gear 136 such that the differential drive gear and the differential feed gear rotate in unison.

The differential drive gear 136 is also engaged with a spindle rotation gear 140, i.e., the teeth of the respective gears 136, 140 are engaged. The spindle rotation gear 140 slips over the spindle 108, and is attached to the spindle 108 by keys 153, such as lugs, that are disposed in key ways 147. The key ways 147 preferably define four slots or grooves formed in the exterior of the spindle along the longitudinal length of the spindle 108. Thus, the spindle drive gear 140 is keyed to the spindle 108 such that relative rotation between the spindle drive gear 140 and the spindle 108 is prevented. This attachment allows transmission of rotational movement to the spindle 108, but permits the spindle 108 to move longitudinally through the spindle drive gear 140. However, it will be realized that the spindle drive gear 140 may be coupled to the spindle 108 in other manners such that the spindle and spindle drive gear rotate together.

Also mounted on the spindle 108 is a spindle feed gear 142 that has interior threads that match with exterior threads 154 of the spindle 108. Hence, the spindle feed gear 142 is threaded on the spindle 108. The spindle feed gear 142 is driven by the differential feed gear 138 while in the forward position or spindle advance position illustrated in FIGS. 2 and 3. When the spindle feed gear 142 is rotated during a drilling cycle, the spindle feed gear 142 threads the spindle 108 through the spindle drive gear 140 in a direction away from the body of the tool, i.e., toward the workpiece 114. A rotational speed differential exists between the spindle drive gear 140 and the spindle feed gear 142 to allow the spindle 108 to be rotated and advanced toward the workpiece 114. This differential between the gears 142, 140 is created by the varying gear ratios between the gear pair 138, 142 and the gear pair 136, 140. Hence, the differential feed gear 138 and differential drive gear 136 are appropriately termed "differential" gears.

To retract the spindle 108, the motor 102 remains running forward, but the differential feed gear 138 is urged upward such that it disengages from the differential drive gear 136 and is no longer coupled to the differential drive gear. As described further below, the tool 100 includes a retract valve 200, which is a manually actuatable fluid valve operable in a first mode for causing the spindle 108 to switch from advancing movement to retracting movement and operable in a second mode for causing the spindle 108 to switch from the retracting movement to the advancing movement. Preferably, the valve 200 is in the first mode when the fluid valve is actuated and is in the second mode immediately after the valve is released.

When manually actuated, the valve 200 preferably causes the spindle 108 to retract by decoupling the differential feed gear 138 and the differential drive gear 136. The differential feed gear 138 is illustrated in the disengaged position in FIG. 4, while FIGS. 2 and 3 illustrate the differential feed gear 138 where it is coupled with the differential drive gear 136 such that the differential drive gear 136 and the differential feed gear 138 rotate together. The device for moving the differential feed gear 138 upward, away from the differential drive gear 136, is described further below. When the differential feed gear 138 is moved upward, it is stopped from rotating and is locked in a stopped position by a plurality of members 156, such as pins, lugs, arms, ears, or other protrusions. In a preferred embodiment of the tool 100, the members 156 are retractable. This retractable feature of the members 156 is described in detail in U.S. patent application entitled "Positive Feed Tool Having Retractable Members", filed Jun. 18, 1999, the entire disclosure of which is hereby incorporated by reference.

Although it is preferred that the differential feed gear 138 be moved away from the differential drive gear 136, the spindle 108 can be retracted in other manners. For example, the differential drive gear 136 may be moved away from the differential feed gear 138 to decouple the two gears. Likewise, the differential feed gear 138 and the differential drive gear 136 can both move away from each other to decouple the two gears to cause the spindle 108 to retract.

Because the differential feed gear 138 is prevented from rotating when disengaged from the differential drive gear 136, the spindle feed gear 142 also stops turning, which causes the spindle 108 to rotate through the internal threads of the spindle feed gear 142 and retract away from the workpiece 114. That is, because the spindle 108, and thus the spindle drive gear 140, are rotating faster than the spindle feed gear 142, the spindle will retract away from the workpiece 114.

The device for causing the differential feed gear 138 to disengage from the differential drive gear 136 is described in detail in U.S. patent application entitled "Positive Feed Tool Having A Clutch", filed Jun. 18, 1999, the entire disclosure of which is hereby incorporated by reference. A brief description of the decoupling device for causing the differential feed gear 138 to disengage from the differential drive gear 136 follows.

Figure 4:
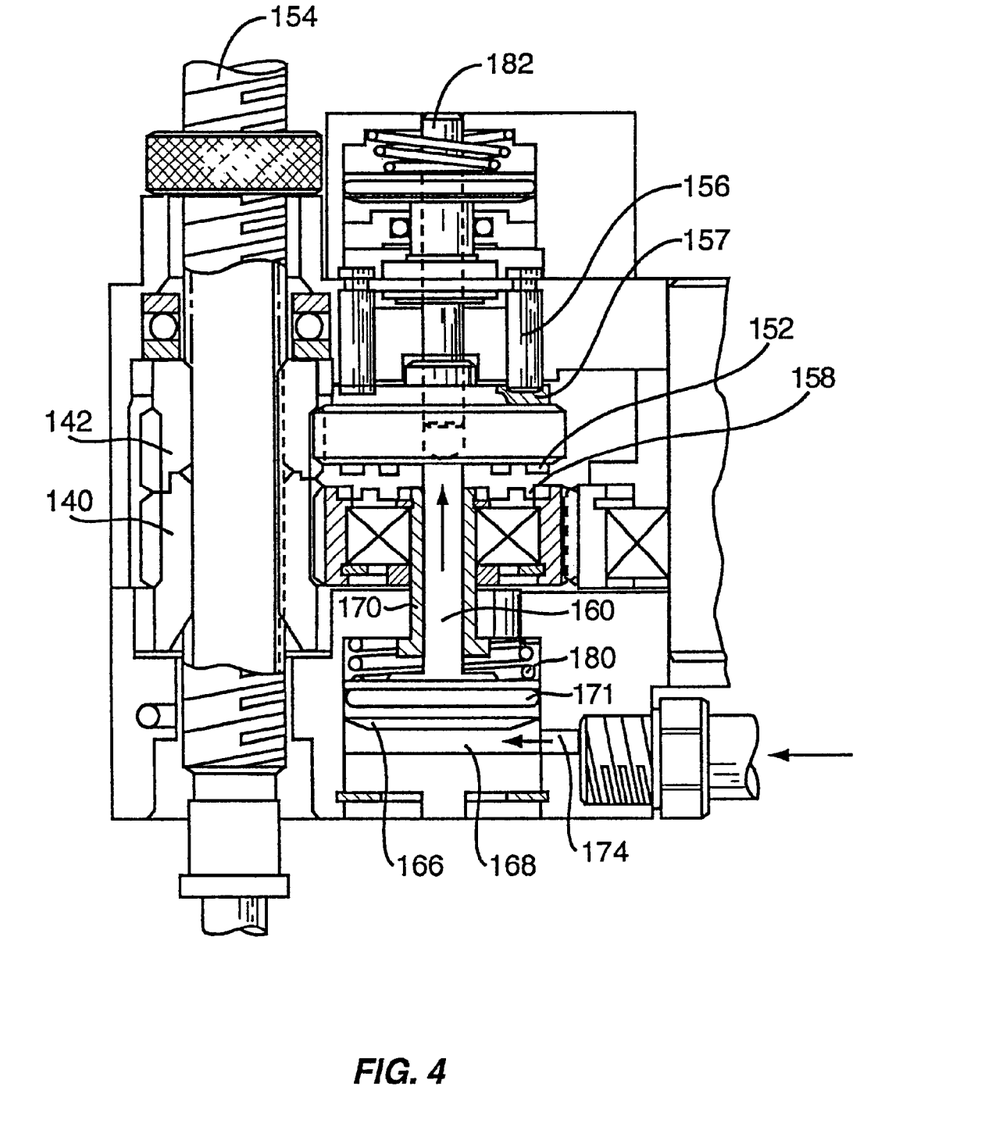
FIG. 4 illustrates a partial sectional view of the head of the right-angle positive feed drill illustrated in FIG. 1, where the differential feed gear and the differential drive gear are not coupled to each other.

As illustrated in FIGS. 3 and 4, the differential feed gear 138 is mounted on a retract shaft 160 by a bearing assembly 150. Hence, the differential feed gear 138 is rotatable about the retract shaft 160. However, the differential feed gear 138 is retained in place along the longitudinal axis of the shaft 160 by a retaining ring and an edge of a head 162 of the shaft 160. That is, the differential feed gear 138 is not moveable along the length of the shaft 160, even though it is rotatable about the longitudinal axis of the shaft 160. The shaft 160 extends parallel with the longitudinal axis of the spindle 108, and is moveable with respect to the housing 126. Because the differential feed gear 138 is rotatably mounted to the shaft 160 in the above-described manner, when the shaft 160 moves with respect to the housing 126 in the direction indicated by the arrow in FIG. 4, the differential feed gear 138 correspondingly moves.

The differential feed gear 138 is located toward the distal end or head end of the shaft 160. The shaft 160 also includes a threaded portion 164 located at the proximal end of the shaft opposite from the distal end having the head 162. A piston 166 is threaded on the threaded portion 164 of the shaft 160. The piston 166 is a solid or hollow cylindrical plunger that is moveable in a cylinder 168 when subjected to a pressurized fluid. Because the piston 166 is connected to the shaft 160, when the piston 166 moves, the retract shaft 160 also moves.

The retract shaft 160 slides in a stationary collar 170, which is mounted to the housing 126. As shown in FIG. 4, the bearing assembly 150 for the differential drive gear 136 is mounted to the collar 170. Hence, when the shaft 160 moves, it will move the differential feed gear 138 relative to the differential drive gear 136, the collar 170, and the housing 126.

The piston 166 includes a recess for receiving a seal 172. The seal 172 defines a moveable seal with an interior surface of the cylinder 168 in the housing 126. For example, the piston 166 may include a recess that receives an O-ring 171 that defines a moveable seal with the cylindrical interior surface of the cylinder 168. The housing 126 also includes a channel 174 that communicates with the interior of the cylinder 168. As described further below, and as described in the above-identified application entitled, "Positive Feed Tool Having A Clutch," pressurized fluid may be supplied to the interior of the cylinder 168 via the channel 174.

The bottom or lower portion of the cylinder 168 is sealed off by a cap 176. When pressurized fluid is supplied to the interior of the cylinder 168, the piston 166 is forcibly moved toward the members 156. The cylinder 168 includes a small vent 178 located above the piston 166 through which fluid between the piston 166 and the housing 126 may escape to atmosphere when the piston 166 is moved in the above-described manner.

The piston 166 is biased to move in a direction away from the members 156, i.e., in the feed direction, by a spring 180. The spring 180 assists in keeping the differential feed gear 138 engaged with the differential drive gear 136 when the piston 166 is not actuated. When the piston 166 is actuated, the pressurized fluid in the cylinder 168 overcomes the force of the spring 180 to cause the piston 166 to move. Because the piston 166 is connected to the shaft 160, when the piston 166 moves, the shaft 160 and the differential feed gear 138 will also move.

The head 162 of the shaft 160 includes a recess that slidably receives a guide pin 182. The guide pin 182 is mounted to the housing 126 and prevents the shaft 160 from moving away from an axis parallel with the longitudinal axis of the spindle 108. Thus, the shaft 160 will slide with respect to the guide pin 182 when the piston 160 is actuated. In the above-described manner, the differential feed gear 138 may be caused to move away from the differential drive gear 136 such that the members 156 engage with the corresponding recesses 157 on the differential feed gear 138 and cause the differential feed gear 138 to stop rotating. The recesses 157 can be indentations, small hollows, or bores. As described earlier, when the differential feed gear 138 is prevented from rotating and is disengaged from the differential drive gear 136, the spindle 108 will retract through the spindle drive gear 140. However, the differential feed gear 138 can be prevented from rotating in other manners. For example, the differential feed gear 138 may include one or more protrusions on its top surface for engaging recesses formed in the housing 126. In this case, the tool 100 would not require the members 156.

Figure 6:
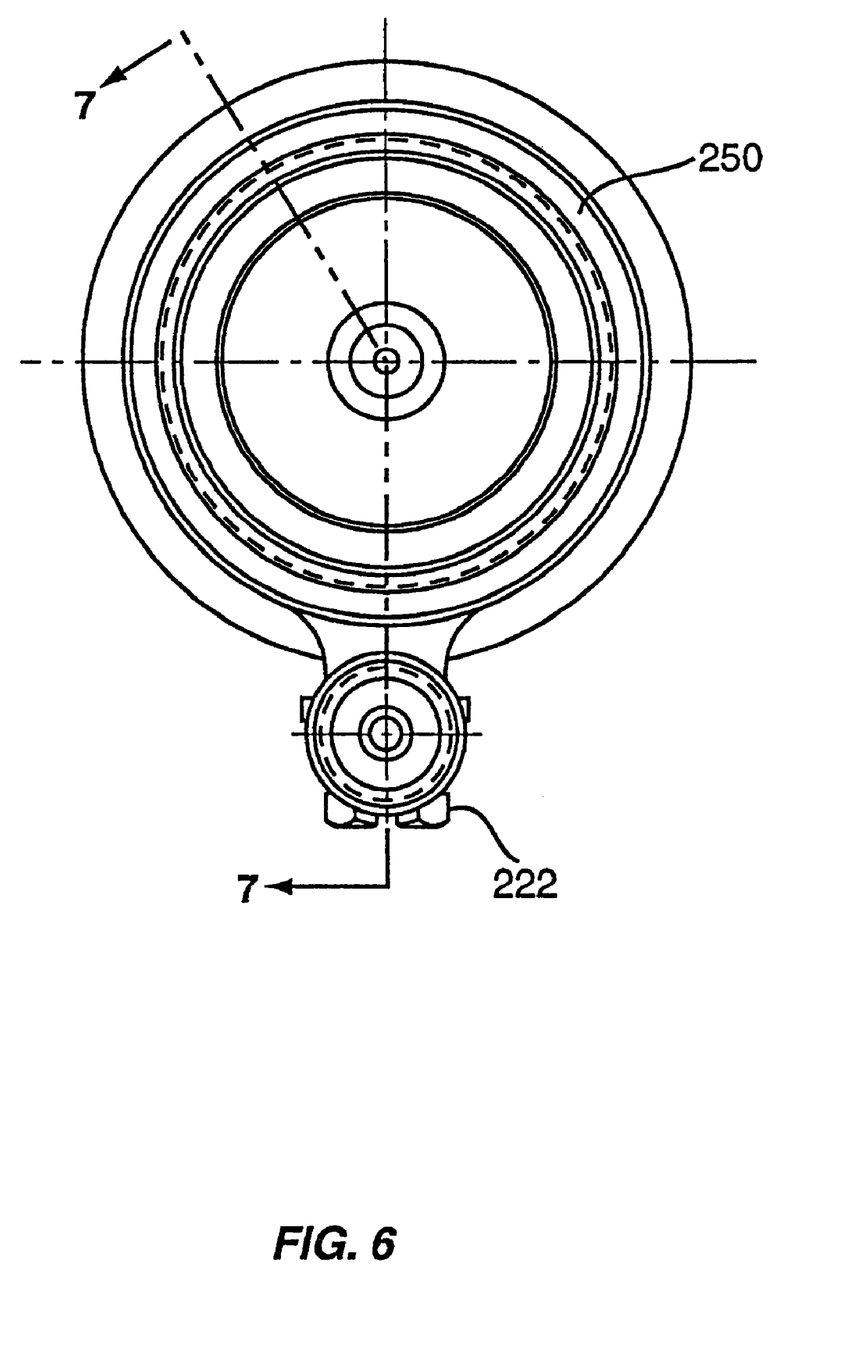
FIG. 6 illustrates an end view of the right-angle positive feed drill illustrated in FIG. 1.
Figure 7A:
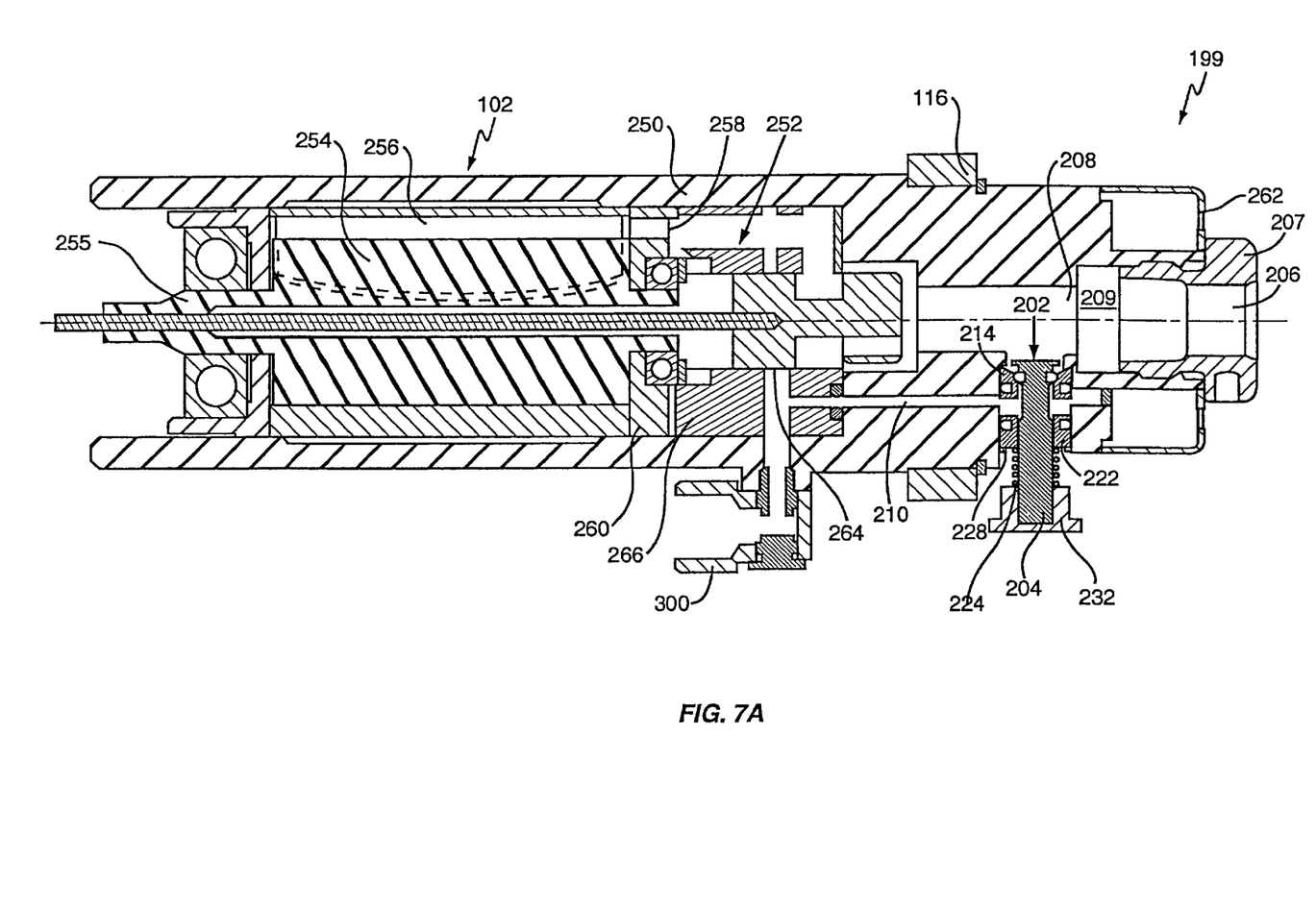
FIG. 7A is a partial sectional view of the rear portion of the right-angle positive feed drill taken along the line 7—7 of FIG. 6, where a retract valve of the drill is illustrated in its unactuated position.
Figure 7B:
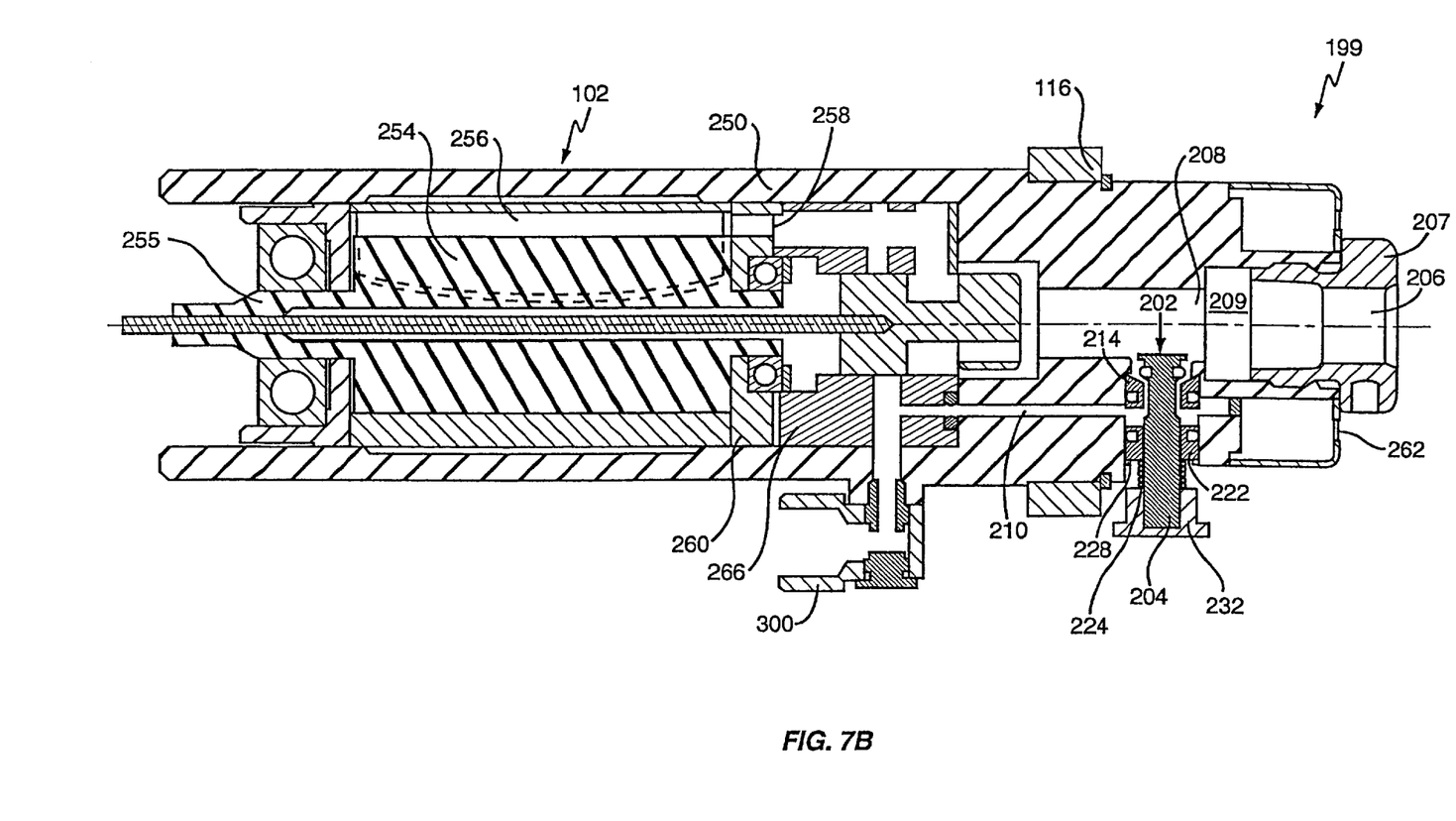
FIG. 7B is a partial sectional view of the rear portion of the right-angle positive feed drill taken along the line 7—7 of FIG. 6, where the retract valve of the drill is illustrated in its actuated position.

FIG. 6 illustrates an end view of the rear portion 199 of the positive feed drill 100, and FIGS. 7A and 7B illustrate a partial cross section of the rear portion 199 of the positive feed drill 100, taken along the line 7—7 of FIG. 6. As shown in FIGS. 7A and 7B, the rear housing or back head housing 250, which defines part of the overall housing 126 of the positive feed drill 100, includes a cylindrical cavity that receives the motor 102, as well as a valve 252 that is actuated by a clutch (not illustrated). The valve 252 and the clutch are described in detail in U.S. patent application entitled "Positive Feed Tool Having a Clutch", filed Jun. 18, 1999. However, the tool 100 need not include the valve 252 to function as contemplated herein.

The air motor 102 is preferably an air motor having a rotor 254 and rotor blades 256 that are pneumatically driven to cause the rotor spline 255 to rotate. As also illustrated in the Figures, the positive feed drill 100 includes a fluid inlet 206 contained in a connector 207 or inlet bushing. Fluid pressure admitted through the connector 207 is communicated into an enclosed chamber 209 where it is exposed to the face of a shut off valve (not illustrated), which is controlled by the throttle 116 (the portion of the shut off valve in the chamber 209 has been omitted from FIGS. 7A and 7B for purposes of clarity). The throttle 116 cooperates with the shut off valve to control the fluid flow into the chamber 209, which in turn feeds the power supply passageway 208 for supplying air into the motor inlet port 258 defined by a rear bearing plate 260 of the motor 102. The opening and closing of the shut off valve is governed by the rotatable throttle ring 116. Air is exhausted from the motor 102 through an exhaust deflector 262 by passageways not illustrated in the figures.

As illustrated in FIGS. 1, 7A, and 7B, the retract valve 200 is located at the rear portion of the tool 100, preferably rearward of the motor 102 and the throttle 116.

Figure 5:
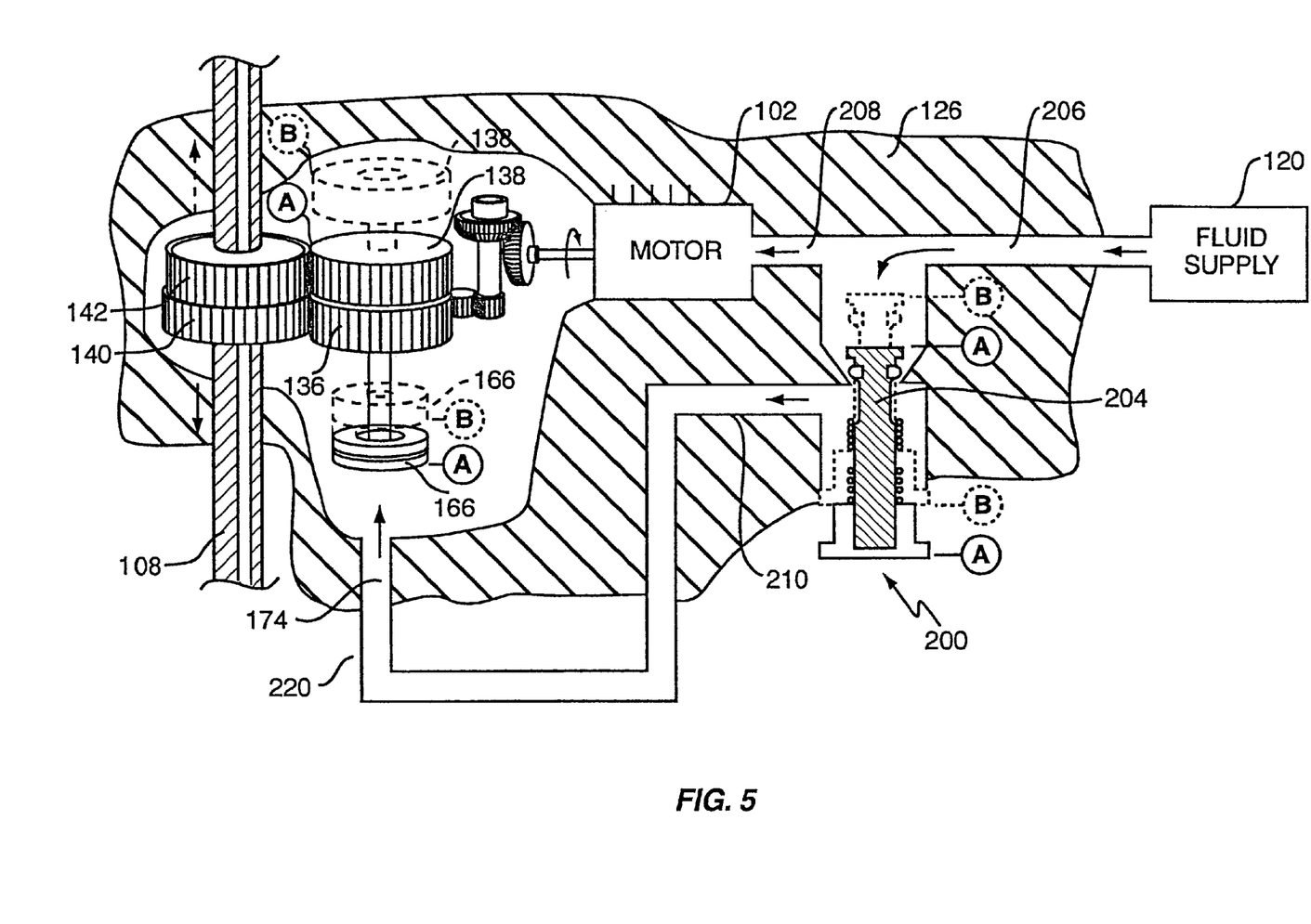
FIG. 5 illustrates a fluid circuit diagram of the right-angle positive feed drill illustrated in FIG. 1.
Figure 8:
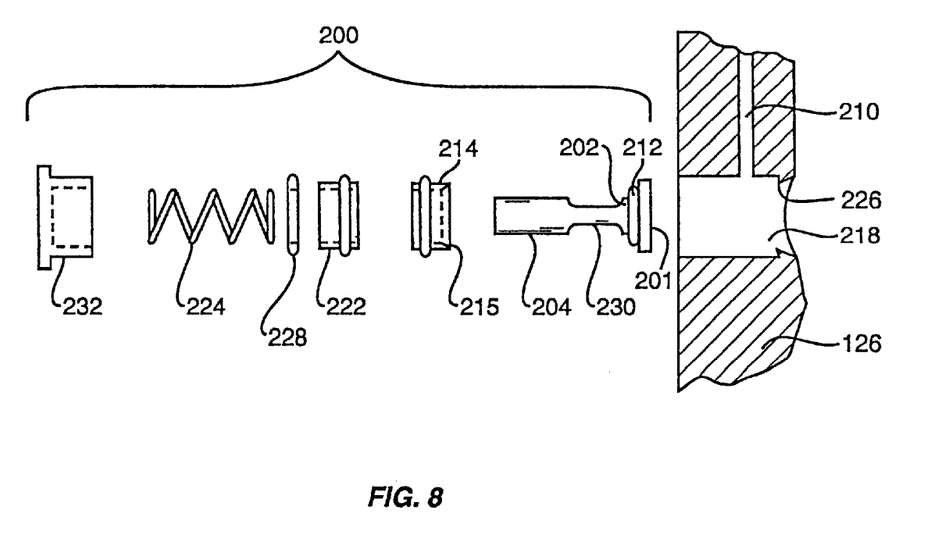
FIG. 8 is an exploded view of the retract valve of the right-angle positive feed drill illustrated in FIG. 1.

FIG. 5 illustrates a fluid flow schematic depicting how the actuation of the retract valve 200 of the positive feed drill 100 causes the spindle 108 to retract. The retract valve 200 is also illustrated in FIGS. 7A, 7B, and 8.

As described further below, the retract valve 200 is preferably a spring loaded poppet valve, which is a valve having a disc 202 attached to a spring-loaded stem 204, where reciprocating movement of the stem causes the valve to open and close. As described below, one feature of the valve 200 is that it can be manually opened, but automatically closes when the valve is released by an operator. Other valves that are manually openable and that automatically closes upon release of the valve will also suffice. Generally speaking, this would include valves that: (1) include a seal, such as a lid or cover to an aperture, which opens a communication for a liquid or gas in one direction and closes it in another (or regulates the amount of flow); and (2) can be manually opened, but automatically close upon release of the valve.

FIG. 7A illustrates the valve 200 when it is unactuated, while FIG. 7B illustrates the valve 200 when it is actuated. The components of the valve 200 are also illustrated in FIG. 8, which is an exploded view of the valve 200. As illustrated in FIGS. 7A, 7B, and 8, the valve 200 includes a stem 204 and a disc 202. In the preferred embodiment, the stem 204 and the disc 202 are integral. However, the disc 202 and stem 204 can be separate items that are attached to each other.

The disc 202 includes a circumferential recess that receives an o-ring 212. The disc 202, having the o-ring 212, defines the seal with an insert 214 in a bore 218 of the housing 126. That is, when the valve is unactuated, the o-ring 212 will seat against a beveled surface 215 of the insert 214 to close-off or seal the bore 218 in which the insert 214 is located. The valve 200 further includes a second insert 222, which defines a seat for a spring 224. The inserts 214, 222, each include an o-ring that prevents fluid from passing between the cylindrical surface of the bore 218 and the exterior surface of the respective inserts. The insert 214 abuts against a ledge 226 in the bore 218, and the insert 222 is held in place in the bore 218 with a retaining ring 228. When the valve is assembled as shown in FIGS. 7A and 7B, the inserts 214, 222 are thus mounted to the housing 126 and are not moveable relative to the housing.

The inserts 214, 222 each include a channel that receives the stem 204 of the valve 200. The stem 204 is moveable in the channels of the inserts and is thus moveable with respect to the housing 126 in a direction perpendicular to the longitudinal axis of the tool 100. The stem 204 of the valve 200 further includes a tapered section 230. The tapered section 230 defines a channel between the stem 204 and the insert 214 through which fluid can pass through the bore 218 to a conduit 210.

A cap 232 is attached to the distal end of the stem 204 located opposite from the proximal end having the disc 202. The cap 232 includes a surface that defines a seat for the spring 224. Hence, the spring 224 is compressed between the cap 232 and the insert 222. With this construction, the spring 224 will force the disc 202 toward the beveled seat 215 of the insert 214. Thus, if the disc 202 is pushed or lifted off of the seat 215 of the insert 214, the disc will immediately return to the seat 215 when the pushing or lifting force is removed because of the biasing action of the spring 224.

To actuate the valve 200, an operator of the tool 100 simply pushes the cap 232 to move the stem 204 radially inward along the axis of the bore 218. This will force the o-ring 212 off of the seat 215, which will fluidly communicate the power supply passageway 208 with the conduit 210.

The bore 218 extends from the exterior of the housing 126 into the interior of the power supply channel 208. The conduit 210 is located in the housing 126 and is in fluid communication with the bore 218, as well as an external line 220. The conduit 210 is partially defined by cavities in the housing 126 and the valve body 266. As shown in FIGS. 7A and 7B, when the spindle 108 of the tool 100 is retracting, the valve 252 blocks the port 264 such that the conduit 210 does not return fluid flow to the power supply channel 208. The external line 220 is in fluid communication with the conduit 174, and the housing 126 includes a fitting 300 to which the external line 220 may be connected (the external line 22 is not illustrated in FIGS. 7A and 7B). Although in the preferred embodiment the line 220 is external of the tool housing 126 because of space limitations, the line 220 could also be located within the housing 126, and can be defined by a plurality of interconnecting passageways.

When the valve 200 is unactuated and the throttle 216 is opened, pressurized fluid is supplied through the fluid inlet 206 and into the power supply channel 208. As illustrated by the FIGS. 5 and 7, the power supply channel 208 supplies pressurized fluid to the motor 102, which in turn rotates the gears in the drive train 204. Hence, rotation of the motor 102 causes the shaft 144 to rotate, which in turns rotates the previously described gears so as to rotate the differential drive gear 136 to cause the spindle to feed as illustrated by the solid arrow in FIG. 5. Thus, during normal advancement or feeding of the spindle 108, the valve 200 is unactuated.

When the valve 200 is unactuated, the valve 200 defines a seal to close-off the conduit 210 in the housing 126. That is, when the valve is closed, the valve prevents fluid communication between the power supply channel 208 and the external fluid line 220. When unactuated, the stem 204 of the valve is located at position A, represented by the solid lines in FIG. 5, and the piston 166 and the differential feed gear 138 are located at position A, also represent by the solid lines in FIG. 5. At position A, the differential feed gear 138 and the differential drive gear 136 are engaged with each other such that they rotate togther and advance the spindle 108.

When the valve 200 is actuated, the stem 204 is moved to position B, illustrated by the dashed lines in FIG. 5. As illustrated by FIG. 5, when the valve 200 is actuated, pressurized fluid is still supplied to the motor 102 such that spindle 108 will rotate. However, when the valve 200 is actuated, the stem 204 is lifted and the seal that closes-off the channel 210 is broken. This will permit pressurized fluid to flow around the recessed portion 230 of the stem, through the conduit 210, through the external line 220, through the conduit 174, and into the cylinder 168 to the under side of the piston 166, which, as described above, causes the differential feed gear 138 to move away from the differential drive gear 136 to cause the spindle 108 to retract as shown by the dashed arrow in FIG. 5. Thus, when the valve 200 is actuated, the piston 166 and the differential feed gear 138 are located at position B, represented by the dashed lines in FIG. 5.

In sum, actuation of the valve 200 will cause the differential drive gear 136 and the differential feed gear 138 to decouple, preferably to cause the differential feed gear 138 to move away from the differential drive gear 136 to disengage the gears. As described earlier, when the differential feed gear 138 is moved upward, it is prevented from rotating, which will cause the spindle 108 to retract.

The fluid supply 120, preferably pressurized air, supplies pressurized fluid to the inlet 206 of the tool 100.

To open the valve 200, an operator of the tool 100 manually pushes or presses the stem 204 inwardly to compress the spring 224 to lift the disc and thus the o-ring 212 off the seat 215. As long as the operator continues to push the stem 204 to compress the spring to maintain the o-ring 212 spaced from the seat 215, the spindle 108 will retract. As soon as the operator stops pushing on the stem 204 to such an extent that the spring 224 forces the stem 204 radially away from the longitudinal axis of the tool, the valve will close because the o-ring will form a seal on the seat 215. Air pressure in the conduit 208 will also tend to close the valve 200 after the operator has stopped pressing the stem 204. This is because the direction of fluid flow is from the supply conduit 208 through the valve 200. The momentum of fluid flow is thus against the flat top surface 201 of the disc 202, which will tend to force the valve closed. Hence, the spring 224 and/or the fluid pressure will cause the valve to automatically close after the operator has stopped pushing the stem 204, i.e., after the operator has released the stem. Thus, the tool 100 need not include the spring 224, depending upon the amount of fluid flow during drilling. The valve 200 automatically closes because it has the capability to close independently of the operator taking any further action. That is, the operator need not force the valve to close it; the valve will independently and spontaneously close itself when the operator is no longer pressing the stem 204, i.e., immediately after the operator releases the valve.

Although actuation of the retract valve 200 supplies pressurized fluid to move the piston 166, it is also contemplated that the tool 100 can be configured such that actuation of the retract valve 200 will close off, prevent, or regulate the flow of pressurized fluid to cause the spindle 108 to retract. For example, the differential feed gear 138 can be biased in a direction away from the differential drive gear, and the retract valve 200 can supply pressurized fluid against the piston 166 or the differential feed gear 138 when the retract valve 200 is unactuated so as to keep the differential feed gear 138 engaged with the differential drive gear 136. In this case, such a spring would be compressed when the valve 200 is unactuated. Upon actuation of the valve 200, the pressure would be relieved or lessened by opening the valve 200, which would cause the spring to move the differential feed gear 138 away from the differential drive gear 136. This approach could also be used to move the differential drive gear 136 away from the differential feed gear 138.

Furthermore, only fluid pressure may be used to cause one or both of the differential feed gear 138 and the differential drive gear 136 to move so as to cause the spindle 108 to retract without the aid of a spring. For example, the unactuated retract valve 200 can supply pressurized fluid to the top side of the piston 166 to cause the differential feed gear 138 to engage the differential drive gear 136 such that the two gears rotate together. When such a valve 200 is actuated, the pressurized fluid is supplied to the underside of the piston 166 and the pressure on the top side of the piston is relieved or lessened, which will cause the differential feed gear 138 to move away from the differential drive gear 136 so as to cause the differential feed gear 138 to stop rotating and cause the spindle 108 to retract. In light of the above, one will appreciate that the fluid valves in accordance with the present invention can be used with a variety of fluid control patterns and devices for moving one or both of the differential gears.

While the valve 200 has been described in reference to the preferred embodiment, where the release of the valve 200 causes the spindle 108 to immediately retract, it will also be appreciated that the valve 200 can be configured such that it will cause the spindle 108 to retract for a predetermined amount of time and then cause the spindle 108 to again advance toward the workpiece 114. For example, the stem of the valve 200 may be operable to slowly return to its closed position one second after it has been actuated. The retract valve 200 can be configured such that this amount of time is adjustable. Hence, an operator of the retract valve 200 may actuate such a valve 200 to cause the spindle 108 to retract for a short period of time and then again advance the spindle 108 when the predetermined period of time has expired. Additionally, the valve 200 can be configured to stay actuated until the operator manually returns the valve 200 to its unactuated state.

In accordance with the preferred embodiment, the retract valve 200 permits an operator of the tool 100 to simply actuate the retract valve 200 to cause the spindle 108 to immediately retract. As soon as the operator lets off of the retract valve 200, i.e. releases the retract valve 200, the retract valve 200 will return to its unactuated position, causing the spindle 108 to immediately advance once again. That is, the operator of the tool 100 need not force the retract valve 200 back to its unactuated position because the valve 200 automatically returns to its unactuated position when the operator releases the valve 200. Thus, an operator of the tool 100 can initiate peck drilling by periodically actuating the retract valve 200 as desired. For example, the operator of the tool 100 may repeatedly press the retract valve 200 to cause the spindle 108 to repeatedly retract and advance. This action tends to remove problematic cutting chips from the drilled hole and the cutter.

Furthermore, the retract valve 200 permits the operator of the tool 100 to easily observe the status of the drilled hole by simply actuating the retract valve 200, and then releasing the valve 200 to continue drilling of the hole. Because the retract valve 200 is located near the rear of the tool 100, i.e., by the motor 102 and throttle 216, the retract valve 200 is at a location that is easily accessible to the operator and at a location where the operator need not worry about possible injury from the rotating cutter 110 and spindle 108 at the head of the tool 100 when actuating the retract valve 200. It will thus be appreciated that the tool 100 provides a conveniently located valve 200 that an operator of the tool 100 may easily actuate to peck drill with the tool.

The principles of the preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed without departing from the spirit of the present invention. Accordingly, it is expressly intended that all such variations, changes, and equivalents which fall within the spirit and scope of the present invention is defined in the claims to be embraced thereby.

We claim:

1. A positive feed tool, comprising:

a threaded spindle;

a spindle drive gear coupled to said spindle such that said spindle and said spindle drive gear rotate together;

a spindle feed gear threaded on said spindle;

a differential drive gear engaged with said spindle drive gear;

a differential feed gear engaged with said spindle feed gear, at least one of said differential feed gear and said differential drive gear being moveable from a first position to a second position, said differential feed gear being coupled to said differential drive gear when said one of said differential feed gear and said differential drive gear is located at said first position such that said differential feed gear and said differential drive gear rotate together, said differential feed gear not being coupled to said differential drive gear when said at least one of said differential feed gear and said differential drive gear is located at said second position; and a retract valve having a member manually movable from a first location to a second location, said member defining a seal when located at said first location, said retract valve being configured to automatically return said member to said first location after said member is manually moved from said first location to said second location and after said valve has been released, said retract valve for causing said at least one of said differential feed gear and said differential drive gear to move to said second position from said first position when said member is at said second location, said retract valve for causing said at least one of said differential feed gear and said differential drive gear to move to said first position from said second position when said member is at said first location.

2. The positive feed tool of claim 1 wherein said retract valve includes a spring that automatically returns said member of said retract valve to said first location after said member of said retract valve is manually moved from said first location to said second location.

3. The positive feed tool of claim 1, wherein said tool includes a housing, said housing having a head end and a rear end located opposite from said head end, said retract valve being located more toward said rear end than said head end.

4. The positive feed drill of claim 3, wherein said retract valve is located adjacent to a throttle of the tool.

5. The positive feed tool of claim 1, wherein said tool is a right-angle positive feed drill.

6. The positive feed tool of claim 1, further comprising:

a fluid supply channel for supplying pressurized fluid to said motor;

a piston connected to said differential feed gear; and a fluid line for supplying pressurized fluid to said piston from said fluid supply channel, said retract valve being located between said fluid line and said fluid supply channel, said retract valve communicating said fluid supply channel and said fluid line when said seal is manually moved to said second location to move said piston and said differential feed gear from said first position to said second position.

7. The positive feed tool of claim 6, further comprising a housing for housing components of said tool, said fluid line being located at least partially external of said housing, said piston being moveable relative to said housing.

8. The positive feed tool of claim 6, further comprising a fluid supply for supplying pressurized fluid to said fluid supply channel.

9. The positive feed tool of claim 1, wherein said retract valve is for causing said differential feed gear to move to said second position.

10. The positive feed tool of claim 9, further comprising means for pneumatically moving said differential feed gear to said second position.

11. A positive feed tool, comprising:
    a spindle;
    a motor;
    a drive train rotatably connecting said motor and said spindle;
    a manually openable valve;
    means for automatically closing said valve after the valve has been manually opened and released;
    means for causing said spindle to retract when said valve is manually opened; and
    means for causing said spindle to advance when said valve is automatically closed.

12. The positive feed tool of claim 11, wherein said drive train includes a differential feed gear, said tool further comprising:
    a fluid supply channel for supplying pressurized fluid to said motor;
    a piston connected to said differential feed gear;
    a fluid line for supplying pressurized fluid to said piston from said fluid supply channel, said valve being located between said fluid line and said fluid supply channel, said valve communicating said fluid supply channel and said fluid line when said valve is opened.

13. The positive feed tool of claim 11, wherein said valve is a poppet valve.

14. The positive feed drill of claim 11, wherein said tool includes a head having said spindle and a rear portion located opposite from said head and located rearward of said motor, said valve being located at said rear portion of said tool.

15. The positive feed drill of claim 10, wherein said tool is a right angle positive feed drill.

16. A method of operating a positive feed tool having a valve that automatically closes, comprising:
    retracting an advancing spindle of the tool by a user manually actuating said valve from a first position to a second position;
    automatically returning valve to said first position in response to said valve being released by the user; and
    advancing said spindle in response to said valve being in said first position.

17. The method of claim 16, wherein said valve is manually actuated by pushing a stem of the valve to open a seal of the valve.

18. The method of claim 16, wherein said valve is automatically closed at least partially by the force of a spring after the valve is released.

19. The method of claim 16, further comprising again retracting the advancing spindle of the tool by manually actuating the valve.

20. The method of claim 16, wherein the valve is opened when the valve is actuated and the valve is automatically closed when the valve is released.

21. A positive feed tool, comprising:
    a rotatable spindle adapted to undergo advancing movement and retracting movement;
    a motor;
    a drive train rotatably connecting said motor and said spindle, said drive train for causing said spindle to undergo the advancing movement and for causing said spindle to under go the retracting movement;
    a manually actuatable fluid valve operable in a first mode for causing said spindle to switch from the advancing movement to the retracting movement and operable in a second mode for causing said spindle to switch from the retracting movement to the advancing movement;
    said valve normally in said first mode and manually actuatable by a user to said second mode and being automatically reset to said first mode when released by the user; and
    said drive train disposed substantially between said valve and said spindle.

22. The positive feed tool of claim 21, wherein said fluid valve is in said first mode when said fluid valve is actuated and is in said second mode immediately after said fluid valve is released.

* * * * *